(12) United States Patent
Kochi et al.

(10) Patent No.: US 7,110,030 B1
(45) Date of Patent: Sep. 19, 2006

(54) SOLID STATE IMAGE PICKUP APPARATUS

(75) Inventors: Tetsunobu Kochi, Hiratsuka (JP); Shigetoshi Sugawa, Atsugi (JP); Isamu Ueno, Hadano (JP); Toru Koizumi, Yokohama (JP); Katsuhito Sakurai, Machida (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/264,719

(22) Filed: Mar. 9, 1999

(30) Foreign Application Priority Data

Mar. 12, 1998 (JP) .......................... 10-061231

(51) Int. Cl.
    H04N 3/14      (2006.01)
    H04N 5/335     (2006.01)

(52) U.S. Cl. ....................... 348/308; 348/294

(58) Field of Classification Search ............... 348/294, 348/297, 300, 301, 308, 302, 311; 250/208.1; 257/249, 250
    See application file for complete search history.

(56) References Cited

U.S. PATENT DOCUMENTS

| | | | |
|---|---|---|---|
| 3,845,295 A | * 10/1974 | Williams et al. | ............ 257/224 |
| 4,954,895 A | 9/1990 | Akimoto et al. | ............ 348/301 |

FOREIGN PATENT DOCUMENTS

| | | |
|---|---|---|
| EP | 0 377 959 | 7/1990 |
| EP | 0 757 476 | 2/1997 |
| EP | 0 863 663 | 9/1998 |
| JP | 2-30189 | 1/1990 |
| JP | 613597 | * 1/1994 |

OTHER PUBLICATIONS

P.P.K. Lee, et al., "An Active Pixel Sensor Fabricated Using CMOS/CCD Process Technology", 1995 IEEE Workshop on Charge–Coupled Device and Advanced Image Sensors.

* cited by examiner

*Primary Examiner*—David Ometz
*Assistant Examiner*—Yogesh Aggarwal
(74) *Attorney, Agent, or Firm*—Fitzpatrick, Cella, Harper & Scinto (57) ABSTRACT

In the solid state image pickup apparatus, in order to achieve complete transfer of the charge from the photodiode to the floating diffusion area, there is provided a pickup apparatus having a photoelectric conversion element, a transfer switch consisting of a MOS transistor for transferring the signal charge generated in the photoelectric conversion element, a floating diffusion capacitance for receiving the signal charge through the transfer switch, and a reset switch consisting of a MOS transistor for resetting the potential of the floating diffusion capacitance, the device comprising at least a potential setting circuit for generating a voltage different from the power supply voltage, wherein the output of the potential setting circuit is applied as a pulse to the gate of the transfer switch and/or the gate of the reset switch.

5 Claims, 10 Drawing Sheets

SOLID STATE IMAGE PICKUP APPARATUS

BACKGROUND OF THE INVENTION

1. Field of the Invention

The present invention relates to a solid state image pickup apparatus, and more particularly to a solid state image pickup apparatus having a floating diffusion unit adjacent to the photoelectric conversion unit.

2. Related Background Art

Figure 1:
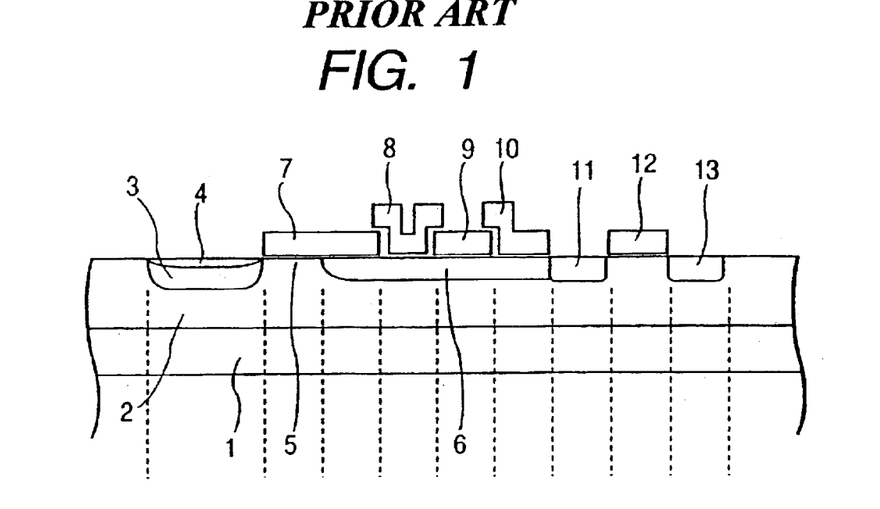
FIG. 1 is a schematic cross-sectional view of a conventional CCD.
Figure 2:
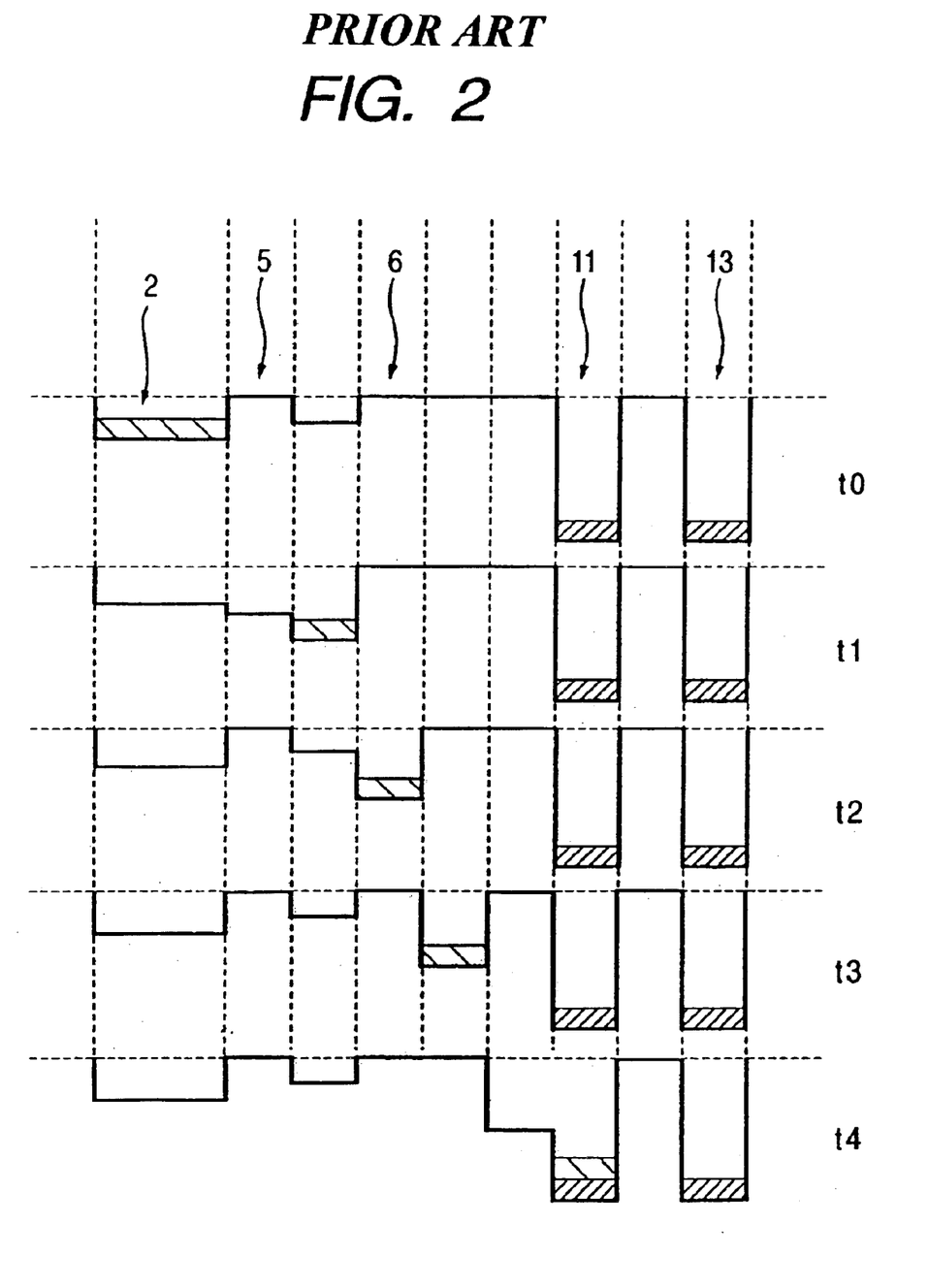
FIG. 2 is a chart showing the function of the conventional configuration.

Conventionally, the charge coupled device (CCD) is widely utilized as the solid state image pickup apparatus. FIG. 1 is a schematic cross-sectional view of a common CCD, and FIG. 2 shows the change of the potential distribution in time of various areas shown in FIG. 1, wherein areas same as those in FIG. 1 are represented by same numbers.

In FIG. 1 there are shown a Si semiconductor substrate 1 of a first conductive type a well area 2 of a second conductive type opposite to that of the substrate 1, and a diffusion area 3 of the first conductive type, constituting a PN photodiode with the well area 2. The PN photodiode is initially given an inverse bias and a photo-induced charge is accumulated according to the incident light amount, in the junction capacitance of the PN photodiode. There are also shown a shallow diffusion area 4 of the second conductive type, provided for reducing the dark current generated on the surface of the diffusion area 3 and forming a diode also between the areas 3 and 4 thereby increasing the amount of the accumulated charge, a transfer channel 5 for reading the photo-induced charge accumulated in the photodiode, and a CCD channel 6 for successive transfer of the read charge.

A control electrode 7 serves to control the charge transfer to the CCD and also the successive charge transfer in the CCD, and is formed on the transfer channel 5 and the CCD channel 6 across an insulation layer. Second, third and fourth electrodes 8, 9, 10 serve to transfer the charge in the CCD in succession. A floating diffusion area 11 finally receives the transferred photo-induced charge, and a voltage amplitude, generated in the floating diffusion area 11 according to the photo-induced charge amount, is detected by a source follower amplifier, omitted in FIG. 1, and outputted to the outside as an electrical signal. There are also shown a reset gate 12 for resetting the floating diffusion area 11, and a reset drain 13 therefor.

In the following the functions will be explained with reference to FIG. 2, which illustrates the potential states of the various areas. At a time t0, the transfer channel 5 is turned off and the photodiode area 2, 3 accumulates the photo-induced charge corresponding to the incident light amount. At a time t1, the transfer channel 5 is turned on to transfer the photo-induced charge to the CCD channel 6 through the transfer channel 5.

At times t2, t3, the control electrodes 8, 9 are controlled in succession to transfer the photo-induced charge is transferred in succession to the portions in the CCD channel 6, positioned directly below the control electrodes. The floating diffusion area 11 is reset in advance at the time t3, and, the photo-induced charge is transferred by the control electrode 10, at a time t4, to the floating diffusion area 11 and is converted therein into a voltage for output.

Figure 3:
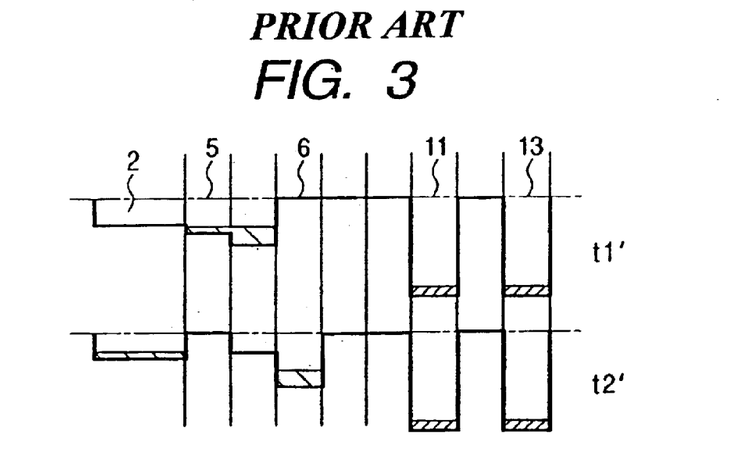
FIG. 3 is a view showing a drawback in the conventional configuration.

In the above-described configuration, however, as the common control electrode 7 is used for controlling the potentials of the transfer channel 5 and the first CCD channel 6, the difference in the depth of the potential wells thereof is uniquely determined by the process conditions such as the concentration profile. For this reason, there may result a case where the depth of the potential well of the CCD channel 6 cannot be sufficiently secured as shown in FIG. 3 in which areas same as those in FIG. 1 are represented by same numbers. As a result, the photo-induced charge cannot be fully transferred but partly remains in the transfer channel 5, leading to defective phenomena such as:

(1) a decrease in the total amount of the transferred charge, leading to a lowered sensitivity; and (2) return of the charge remaining in the transfer channel 5 to the photodiode 2, 3, thereby generating a retentive image and significantly deteriorating the image quality.

Figure 5:
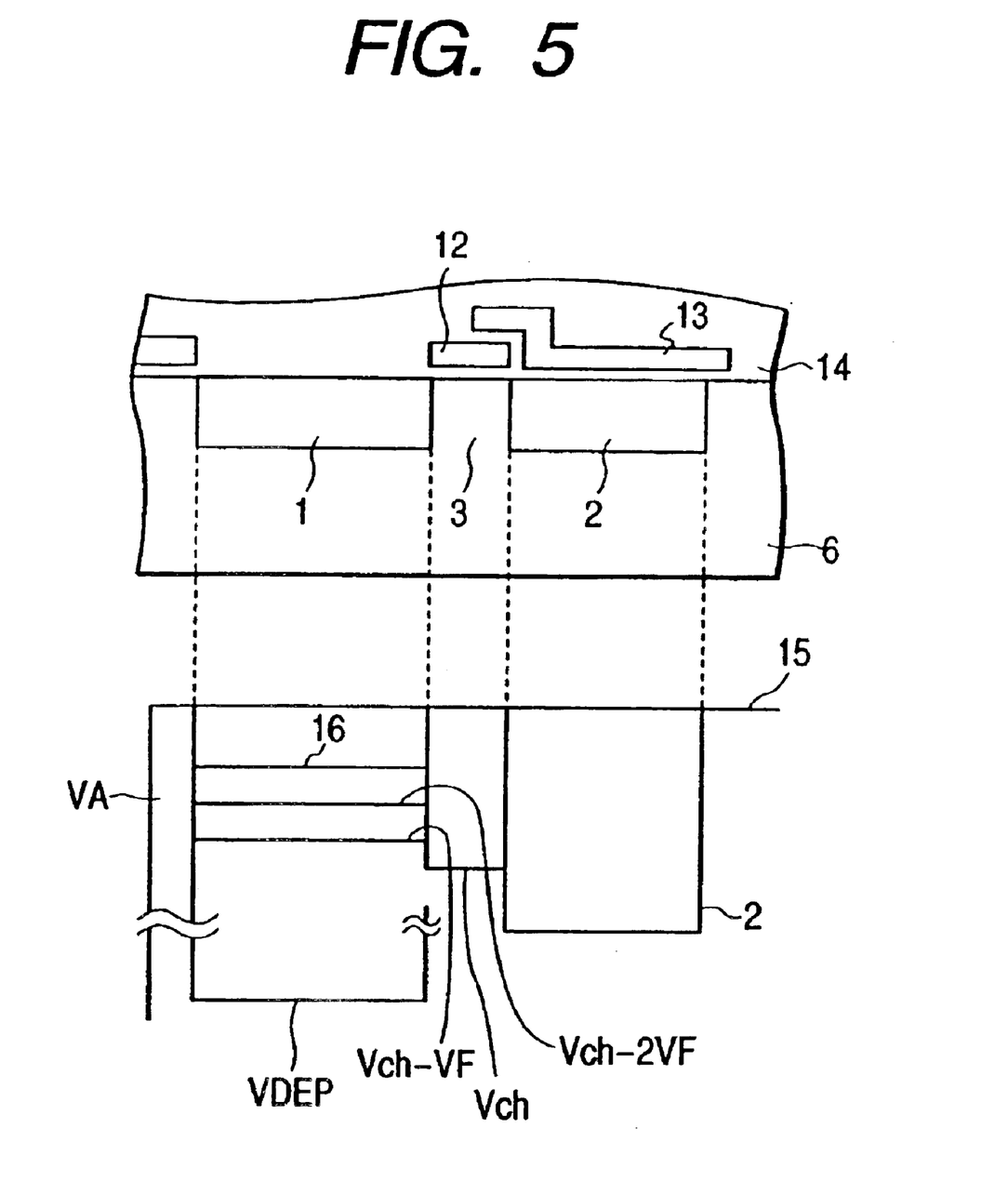
FIG. 5 is another schematic view of a conventional configuration.

Also, Japanese Patent Application Laid-Open No. 2-30189 discloses a configuration having an electrode for controlling the charge transfer from the photodiode to the CCD channel and another electrode for controlling the charge transfer in the CCD, as shown in FIG. 5. Referring to FIG. 5, a plurality of n-type accumulation areas 1 for accumulating the signal charges induced by the incident light are arranged on a p-type substrate 6, and a transfer gate 3 is provided between the accumulation area 1 and a vertical CCD register 2, of which an end is connected to a horizontal CCD register composed of a transfer gate 12, a transfer electrode 13 for the vertical CCD register and a silicon dioxide layer 14. VA denotes the potential of the n-type accumulation area 1, taking the Fermi potential 15 of the interior of the p-type substrate as a reference, while VDEP denotes the potential VA required for completely depleting the accumulation area 1, and Vch denotes the channel potential when the transfer gate 3 is turned on. The potential VA is lowered in the drawing in response to the light entering the accumulation area 1, and the accumulated charge is transferred to the vertical CCD register 2 by lowering the potential of the gate 12.

However, according to the above-mentioned patent application, the depth of the potential well of the CCD channel is still uniquely determined by the process conditions such as the concentration profile, so that there are similarly encountered the above-mentioned drawbacks.

Figure 4:
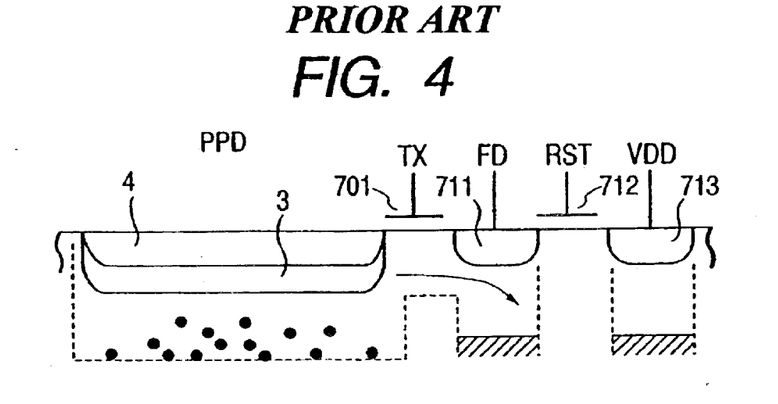
FIG. 4 is a schematic cross-sectional view of a second configuration.

In the field of solid state image pickup apparatus, in addition to the CCD, the MOS sensor is recently attracting attention and is being actively developed because of advantages such as ease of one-chip formation of the peripheral circuits. For example, an exhibit titled "An Active Pixel Sensor Fabricated Using CMOS/CCD Process Technology" (exhibited at the 95 IEEE WORKSHOP on Charge-Coupled Devices and Advanced Image Sensors) discloses a CMOS sensor and its potential chart as shown in FIG. 4. As shown in FIG. 4, in the CMOS sensor, the floating diffusion area 711 and the source follower amplifier (not shown) are provided for each pixel, instead of at the end of the CCD register in case of the CCD. In FIG. 4, components same as those in FIG. 1 are represented by same numbers. There are also shown a transfer gate 701 provided for each pixel, and a floating diffusion area 711 provided for each pixel. The photo-induced charge, generated in the photodiode area is transferred to the floating diffusion area 711, and the amplitude of the voltage generated therein according to amount of photo-induced charges is detected by the source follower amplifier, omitted in FIG. 4 but provided for each pixel, and outputted to an output line through a pixel selecting switch. There are also shown a reset gate 712 for resetting the floating diffusion area 711 provided for each pixel, and a reset drain 713 therefor.

Such circuit configuration of transferring the charge of each pixel to the corresponding floating diffusion area 711 and effecting the selection of pixels by a common MOS circuit allows to achieve both a high S/N ratio as the sensor and a high performance realized by a one-chip MOS circuit.

However such conventional configuration is still associated with the drawbacks similar to those in the conventional CCD configuration, because of changes in the reset voltage in the floating diffusion area and in the depth of the potential well of the transfer channel, caused by a fluctuation in the manufacturing process conditions. These drawbacks have not been paid any attention, and the potential chart of the aforementioned exhibit only showed a configuration that is incapable of complete transfer of the charge from the photodiode to the floating diffusion area.

SUMMARY OF THE INVENTION

The object of the present invention is to provide a configuration of the solid state image pickup apparatus, capable of complete transfer of the charge from the photoelectric conversion element to the floating diffusion area.

The above-mentioned object can be attained, according to a scope of the present invention, by providing a solid state image pickup apparatus comprising a photoelectric conversion element, transfer switch means consisting of a MOS transistor for transferring a signal charge generated in the photoelectric conversion element, a floating diffusion capacitance for receiving the signal charge through the transfer switch means, and reset switch means consisting of a MOS transistor for resetting the potential of the floating diffusion capacitance, wherein the pickup apparatus further comprises at least one potential setting means for generating a voltage different from the power supply voltage, and the output of the potential setting means is supplied as a pulse to the gate of the transfer switch means and/or the gate of the reset switch means, to control the gate potentials at the respectively optimum potentials.

According to an another aspect of the present invention, there is provided a solid state image pickup apparatus comprising a PN junction unit capable of photoelectric conversion, a transferring MOS transistor for transferring a signal charge generated in the PN junction unit, a floating diffusion unit for receiving the signal charge through the transferring MOS transistor, a reset MOS transistor for resetting the potential of the floating diffusion unit, first potential setting means for supplying a voltage to be applied to the gate of the transferring MOS transistor and a second potential setting means for supplying a voltage to be applied to the resetting MOS transistor.

These configurations allows to obtain a satisfactory image.

Other objects of the present invention, and the features thereof, will become fully apparent from the following description, which is to be taken in conjunction with the attached drawings.

DESCRIPTION OF THE PREFERRED EMBODIMENTS

Figure 6A:
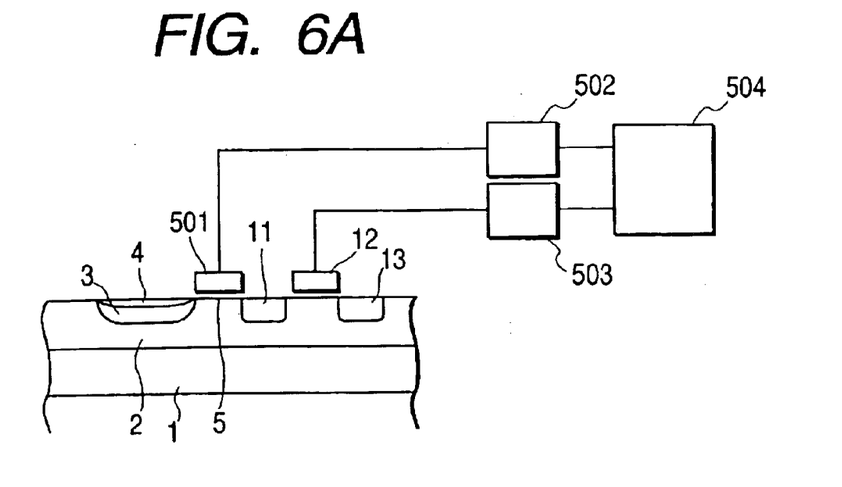
FIGS. 6A, 6B, 7A, 7B, 8 and 9 are views showing the function of the first embodiment of the present invention.

Now there will be given a detailed description on a first embodiment of the present invention, with reference to the attached drawings. FIG. 6A is a schematic view showing the first embodiment of the present invention, wherein shown are a Si semiconductor substrate 1 of a first conductive type, a well area of a second conductive type opposite to that of the substrate 1, a diffusion area 3 of the first conductive type, forming a PN photodiode with the well area 2, a shallow diffusion area 4 of the second conductive type, a transfer channel 5 for reading the photo-induced charge accumulated in the photodiode, a floating diffusion area 11, a reset gate 12 for resetting the floating diffusion area 11, and a reset drain 13 therefor. Components same as those in FIG. 5 are represented by same numbers and will not be explained further.

There are also provided a transfer gate 501 of a transfer switch for transferring the photo-induced charge in the photodiode 2, 3, 4, a control pulse generation circuit 504, a first potential setting circuit 502 for setting the voltage of the control signal generated by the control pulse generation circuit 504 for application to the transfer gate 501, and a second potential setting circuit 503 for setting the voltage of the control signal generated by the control pulse generation circuit 504 to supply that voltage to the reset gate 12.

The first and second potential setting circuits 502, 503 are so constructed that the transfer gate 501 and the reset gate 12 can be set at respectively independent potentials.

Figure 6B:
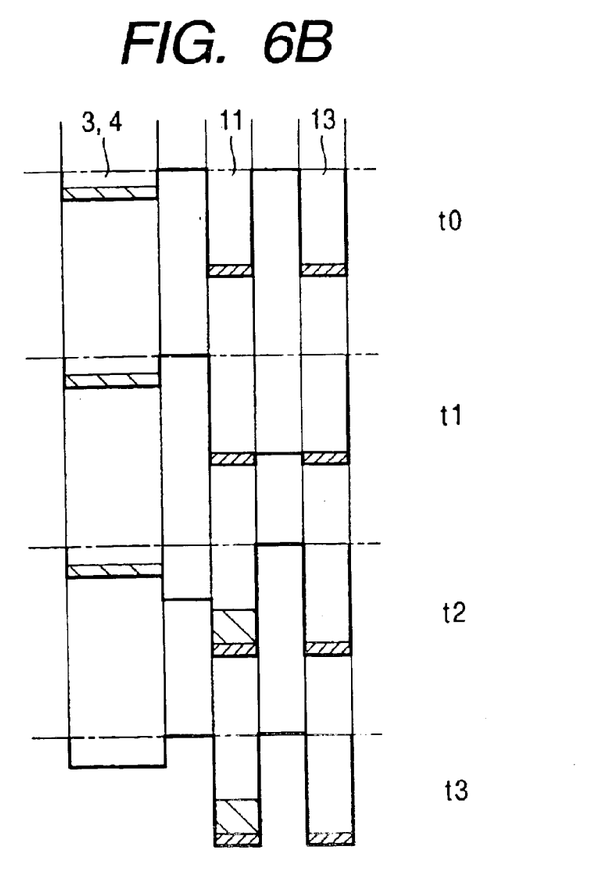

Now, the function of the present embodiment will be explained with reference to FIG. 6B, showing the potential state of various areas at different timings. At a time t0, the transfer channel 5 is turned off and a photo-induced charge is accumulated in the photodiode area 2-4 according to the amount of incident light. The floating diffusion area 11 is reset by turning on the reset gate 12 at a time t1. Then, at a time t2, the photo-induced charge is transferred from the photodiode area 2-4 through the transfer channel 5 to the floating diffusion area 11 and converted therein into a voltage and outputted. At a time t3, the transfer channel 5 is turned off again, and the photodiode area 2-4 of each pixel starts next charge accumulation.

Figure 7A:
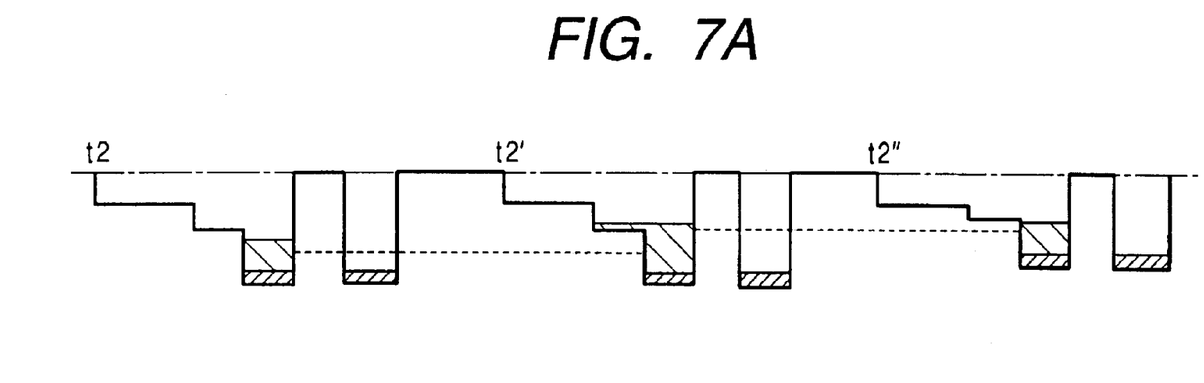

In these operations, as shown at time t2' in FIG. 7A, the charge may remain in the transfer channel 5 because of a fluctuation in the resetting voltage, resulting for example from a fluctuation in the manufacturing process. Ordinarily, a power supply line is commonly used for resetting and for the source follower circuit of each pixel, in order to simplify the wiring and to achieve a compacter layout, thereby reducing the pixel size and increasing the aperture ratio. Such configuration is adopted also in the present embodiment, and the resetting voltage is selected not as the actual power source voltage but as a value determined by the threshold value Vth of the resetting MOS transistor.

Figure 8:
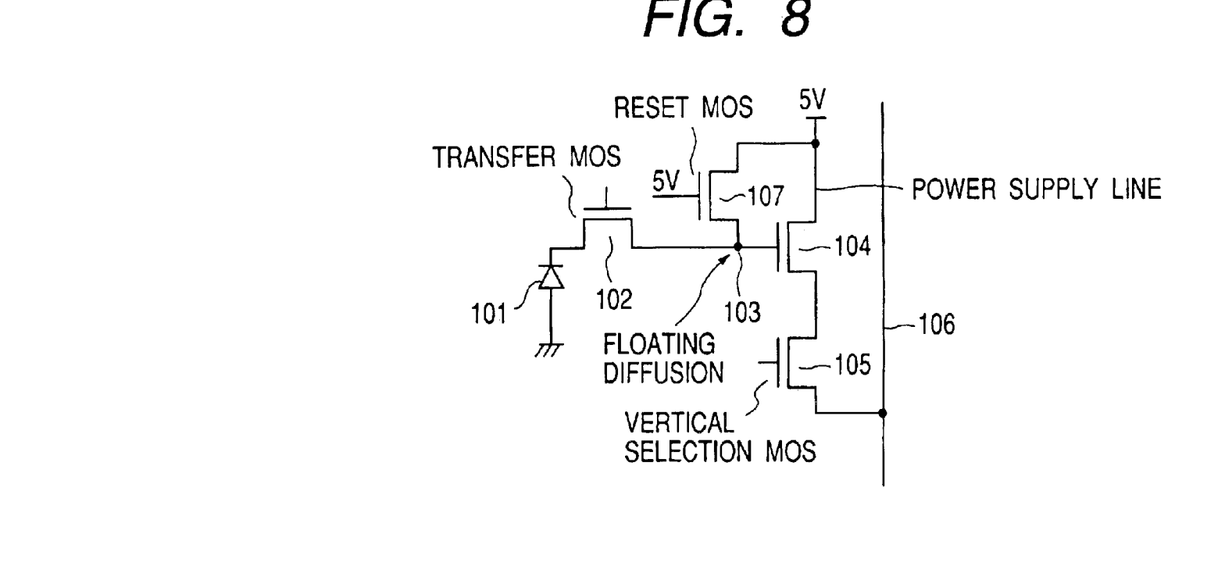

For explaining the circuit configuration of the solid state image pickup apparatus, an equivalent circuit corresponding to a pixel is shown in FIG. 8. A photodiode 101 accumulates a photo-induced charge which is transferred by a transfer switch 102, and the transferred photo-induced charge is temporarily stored in a floating diffusion area 103, amplified by a source follower MOS transistor 104 and is read out by a vertical selecting MOS transistor 105 to an output line 106. The floating diffusion area 103 is connected to a power source through a resetting MOS transistor 107, and, in the resetting operation by the application of a voltage of 5V to the gate thereof, the floating diffusion area 103 is reset to a potential of 5V−Vth.

For example, if the gate voltage of the resetting MOS transistor 102 is 5V for a power source voltage of 5V, the resetting voltage becomes 5V−Vth. The threshold voltage of the MOS transistor cannot be made completely free from fluctuation because of fluctuation in the fluctuation of the Si layer or in the thickness of the gate insulation layer, so that the resetting voltage inevitably shows a fluctuation.

Also, with an increase in the threshold value Vth, the effective resetting voltage is lowered so that the potential well becomes shallower as shown in t2' in FIG. 7A. In such state, if the gate voltage and the threshold voltage of the transferring MOS transistor 102 remain constant, there will result charge remaining in the channel of the transferring MOS transistor 102 as shown in t2'. In order to prevent such charge remaining phenomenon, it is effective to lower the gate voltage of the transferring MOS transistor 102 as shown in t2". Consequently the voltage of the gate 501 of the transferring MOS transistor 102 is controlled by the first potential setting circuit 502, independently from the voltage of the gate 12 of the resetting MOS transistor 107. Also, in order to shift from the state shown in t2' in FIG. 7A to the state shown in t2", the voltage of the gate 501 of the transferring MOS transistor 102 is lowered to reduce the potential of the channel 5 thereof, thereby transferring the charge in the channel to the floating diffusion area 103.

Figure 7B:
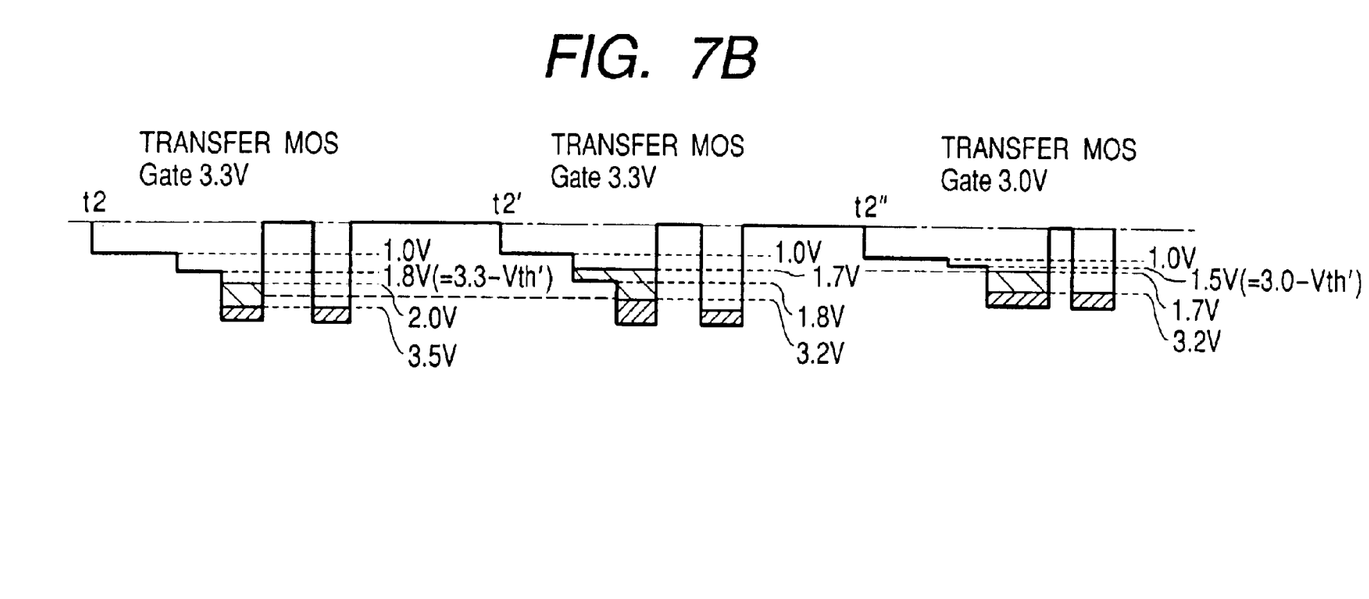

More specifically, in a case of the electron accumulation type as shown in FIG. 7B, for example when a gate-on voltage is 5 V for the resetting MOS transistor 107, a reset voltage is 3.5V=5V−Vth (Vth=1.5V) for the floating diffusion area 103, a saturation signal voltage is 1.5V, a saturation voltage is 2V for the floating diffusion area 103 and a depletion voltage is 1V for the photodiode, the gate-on voltage Vg of the transferring MOS transistor 102 is so set as to satisfy a relation 1+Vth'<Vg<2+Vth' (for example, 2.5 V<Vg<3.5V). As an example, Vg is selected as 3.3V.

If the resetting voltage varies from 3.5 V to 3.2 V by the fluctuation of the process, the saturation voltage at the floating diffusion area 103 becomes 1.7 V, so that the charge remains in the channel of the transferring MOS transistor 102 unless Vg is so selected as to satisfy a condition 2.5V<Vg<3.2V.

In such case, the proper operation without the retentive charge can be achieved by changing Vg from 3.3 V to for example 3.0 V so as to satisfy the above-mentioned condition.

Now there will be given, with reference to FIG. 9, a detailed explanation on the first potential setting circuit shown in FIGS. 6A and 6B.

Figure 9:
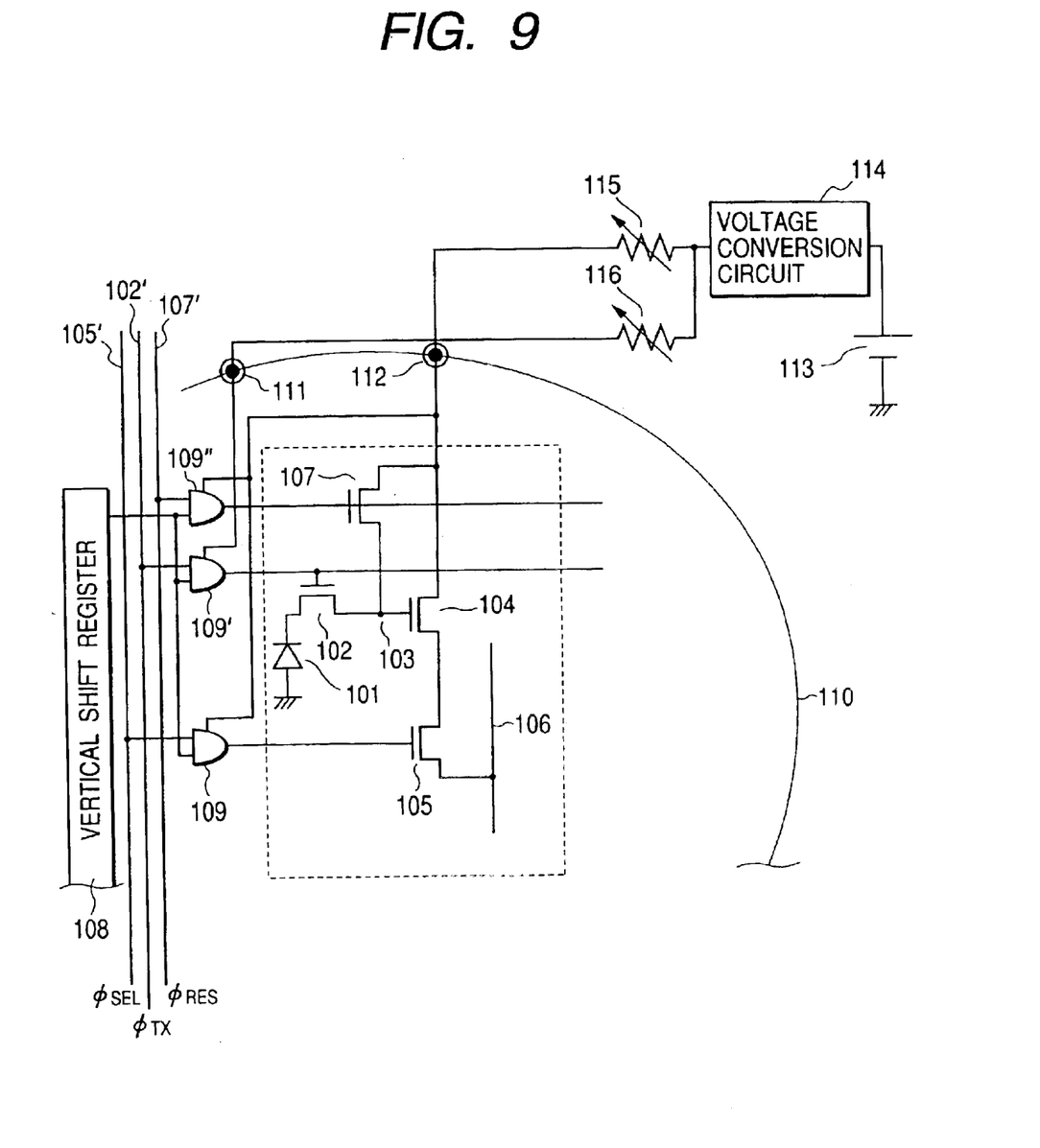

FIG. 9 shows a solid state image pickup apparatus 110 for converting incident light into an electrical signal for output to the exterior and a voltage supply unit for driving the solid state image pickup apparatus 110, both apparatus and unit being formed on a same semiconductor chip.

In the solid state image pickup apparatus 110, there is only shown a pixel, while other pixels, horizontal shift register etc. are omitted.

In FIG. 9, the circuit in a broken-lined frame is same as that shown in FIG. 8. In FIG. 9, there are shown a vertical shift register 108 for outputting pulses in succession, and AND circuits 109, 109' and 109" each having two input/output terminals and an electric power source terminal-for driving the AND circuit. In this AND circuit, once high voltage is applied to both two input terminals, a voltage value of the electric power source voltage for driving of the AND circuit is output from the output terminal. As this AND circuit, an AND circuit having a CMOS structure may be available, for example.

There are also shown a voltage supply unit 113 such as a battery, a voltage conversion circuit 114 for converting the voltage of the voltage supply unit 114 into a desired voltage, variable resistors 115, 116, a power supply voltage input terminal 112 for entering a voltage for driving the solid state image pickup apparatus, and an input terminal 111 for entering a voltage for driving the transferring MOS transistor 102. In addition, there are shown signal lines 105', 102' and 107' for respectively supplying pulses $\phi_{sel}$, $\phi_{TX}$ and $\phi_{RES}$ to be used to turn on and off the vertical selecting MOS transistor 105, the transfer switch 102 and the resetting MOS transistor 107. Under a condition that a pulse is applied from the vertical shift register 108 to one of input terminals of each of the three AND circuits, the AND circuit 109 outputs the voltage value input from the terminal 112, when the pulse $\phi_{SEL}$ is applied to the signal line 105'; the AND circuit 109' outputs the voltage value input from the terminal 111, when the pulse $\phi_{TX}$ is applied to the signal line 102'; and the AND circuit 109" outputs-the voltage value input from the terminal 112, when the pulse $\phi_{RES}$ is applied to the signal line 107'. In the present embodiment, the AND circuit 109, the input terminal 111 and the variable resistor 116 constitute the first voltage setting circuit 502 shown in FIGS. 6A and 6B.

Thus, even if the threshold voltage Vth of the resetting MOS transistor 107 increases to reduce the effective resetting voltage whereby the potential well becomes shallow as shown by t2' in FIG. 7A, the above-described configuration can solve the situation in the following manner.

As the voltage at the input terminal 111 can be made different, by the variable resistor 116, from the voltage at the power supply voltage input terminal 112, the potential well can be realized in a form shown by t2" in FIG. 7A by reducing the voltage entered from the input terminal 111. Thus, in the present embodiment, the pulse voltage for driving the transferring MOS transistor 102 can be adjusted independently from the pulse voltage for driving the resetting MOS transistor 107. Consequently, even if the resetting voltage is lowered by the fluctuation in the manufacturing process, the ideal potential well can be formed by adjusting the pulse for driving the transferring MOS transistor 102.

Such operation-prevents the presence of the photoinduced induced charge remaining in the transfer channel 5, thereby providing advantages such as:

a) securing a constant amount of the total transferred charge, thereby ensuring a constant sensitivity; and b) avoiding generation of the retentive image.

Figure 10:
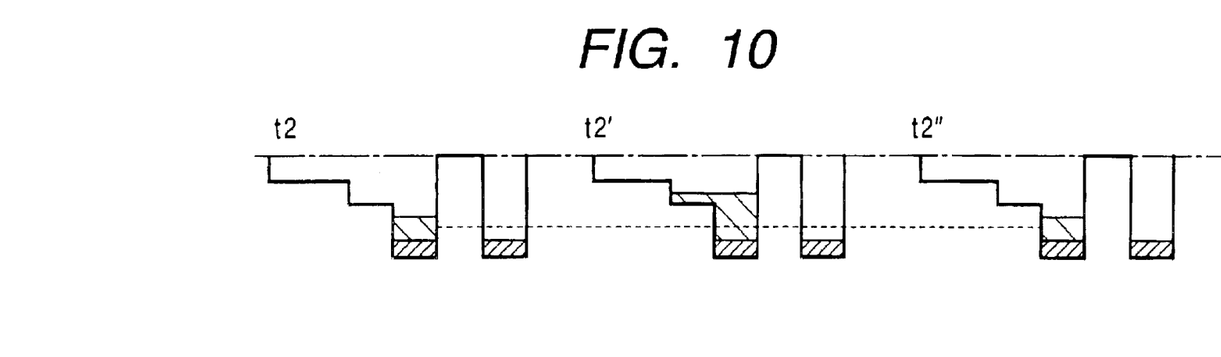
FIGS. 10 and 11 are views showing the function of the second embodiment of the present invention.

FIG. 10 is a view showing the potentials of various areas for explaining a second embodiment of the present invention. In contrast to the first embodiment, in which the proper transferring operation is realized, even in the presence of fluctuation in the manufacturing process, by controlling the voltage of the transferring MOS transistor 102, the present embodiment is to achieve a similar effect by controlling the voltage of the resetting MOS transistor 102. The circuit configuration corresponding to FIG. 10 is similar to that shown in FIGS. 6A and 6B and will not, therefore, be explained further.

In the following there will be explained, with reference to FIG. 11, the second setting circuit shown in FIGS. 6A and 6B.

Figure 11:
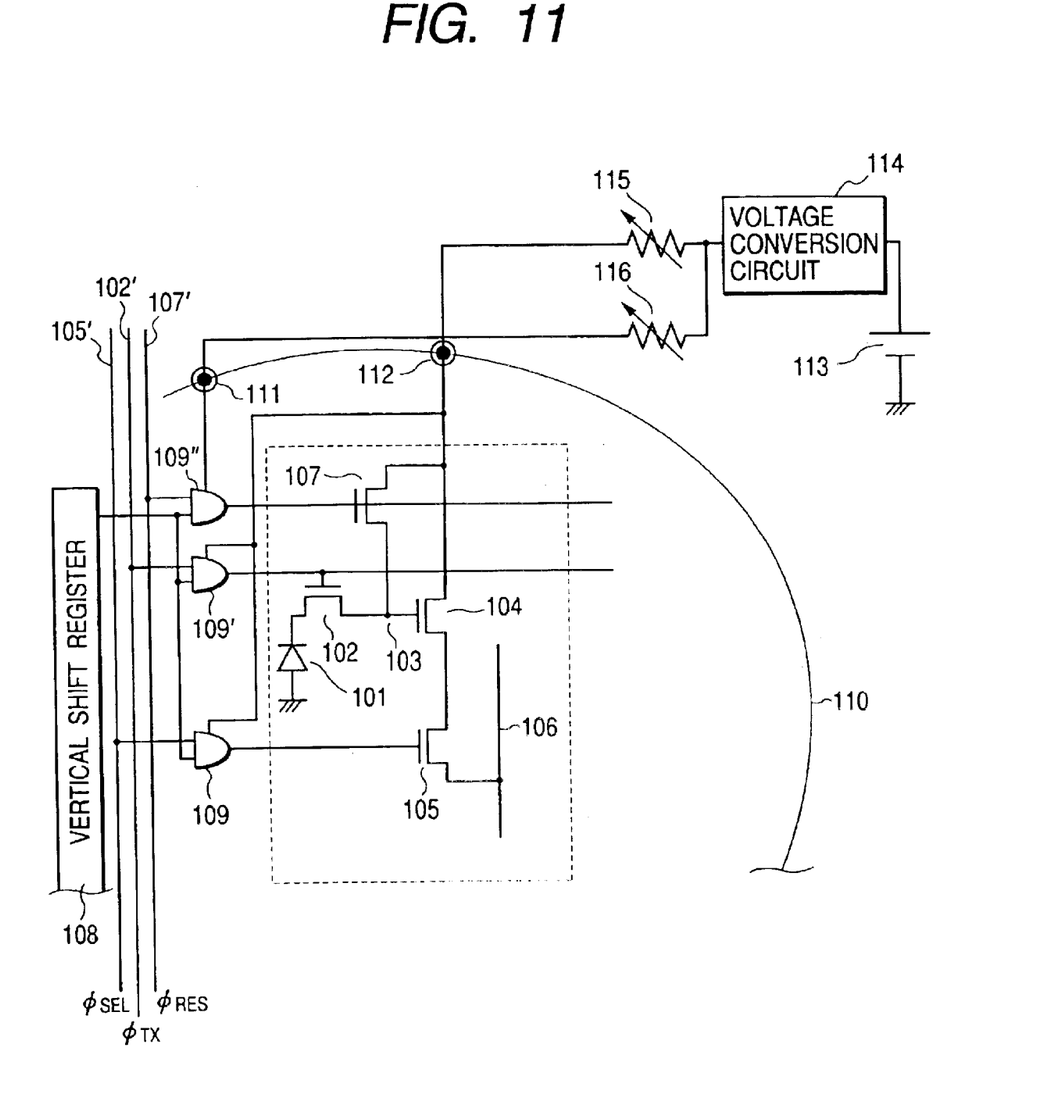

The circuit shown in FIG. 11 is different from that shown in FIG. 9 in that the voltage entered from the input terminal 111 is supplied to the gate of the resetting MOS transistor 107 and the voltage entered from the power supply voltage input terminal 112 is supplied to the gate of the transferring MOS transistor 102. In the present embodiment, the AND circuit 109, the input terminal 111 and the variable resistor 116 constitute the second potential setting circuit 503 shown in FIGS. 6A and 6B.

Thus, even if the threshold voltage Vth of the resetting MOS transistor 107 increases to reduce the effective resetting voltage whereby the potential well becomes shallow as shown by t2' in FIG. 10, the above-described configuration can solve the situation in the following manner.

As the voltage at the input terminal 111 can be made different, by the variable resistor, from the voltage at the power supply voltage input terminal 112, the potential well can be realized in a form as shown by t2" in FIG. 10 by elevating the voltage entered from the input terminal 111. Thus, in the present embodiment, the pulse voltage for driving the resetting MOS transistor 107 can be adjusted independently from the pulse voltage for driving the transferring MOS transistor 102. Consequently, even if the potential of the floating diffusion area 103 comes close to that of the transferring MOS transistor 102 by the fluctuation in the manufacturing process, the ideal potential well can be formed by adjusting the pulse for driving the resetting MOS transistor 107.

The state at a time t2 in FIG. 10 is same as that at a time t2 in FIG. 6B. Also in the present embodiment, the operations at the time t0 and t1 are same as those in FIG. 6B.

As shown at a time t2' in FIG. 10, the resetting voltage may vary for example because of fluctuation in the manufacturing process, resulting in a charge remaining in the transfer channel 5. In the present embodiment, however, the voltage of the reset gate 12 is independently controlled by the second potential setting circuit 503 for elevating the resetting voltage of the floating diffusion area 11. For example, if the resetting voltage varies from 3.5 V to 3.3 V in the example shown in FIG. 7B, it can be returned to 3.5 V by varying the gate-on voltage of the resetting MOS transistor 107. In this manner, the proper transferring operation can be realized without changing the conditions of the transferring MOS transistor 102. Such setting realizes a condition:

saturation voltage of floating diffusion area 11>
channel voltage of transfer MOS transistor in
on-state>depletion voltage of photodiode, whereby the charge can be transferred to the floating diffusion area 103 without remaining on the photodiode and the channel of the transferring MOS transistor 102, and there can be achieved an effect similar to that of the first embodiment for preventing the charge remaining in the transfer channel 5.

Figure 12:
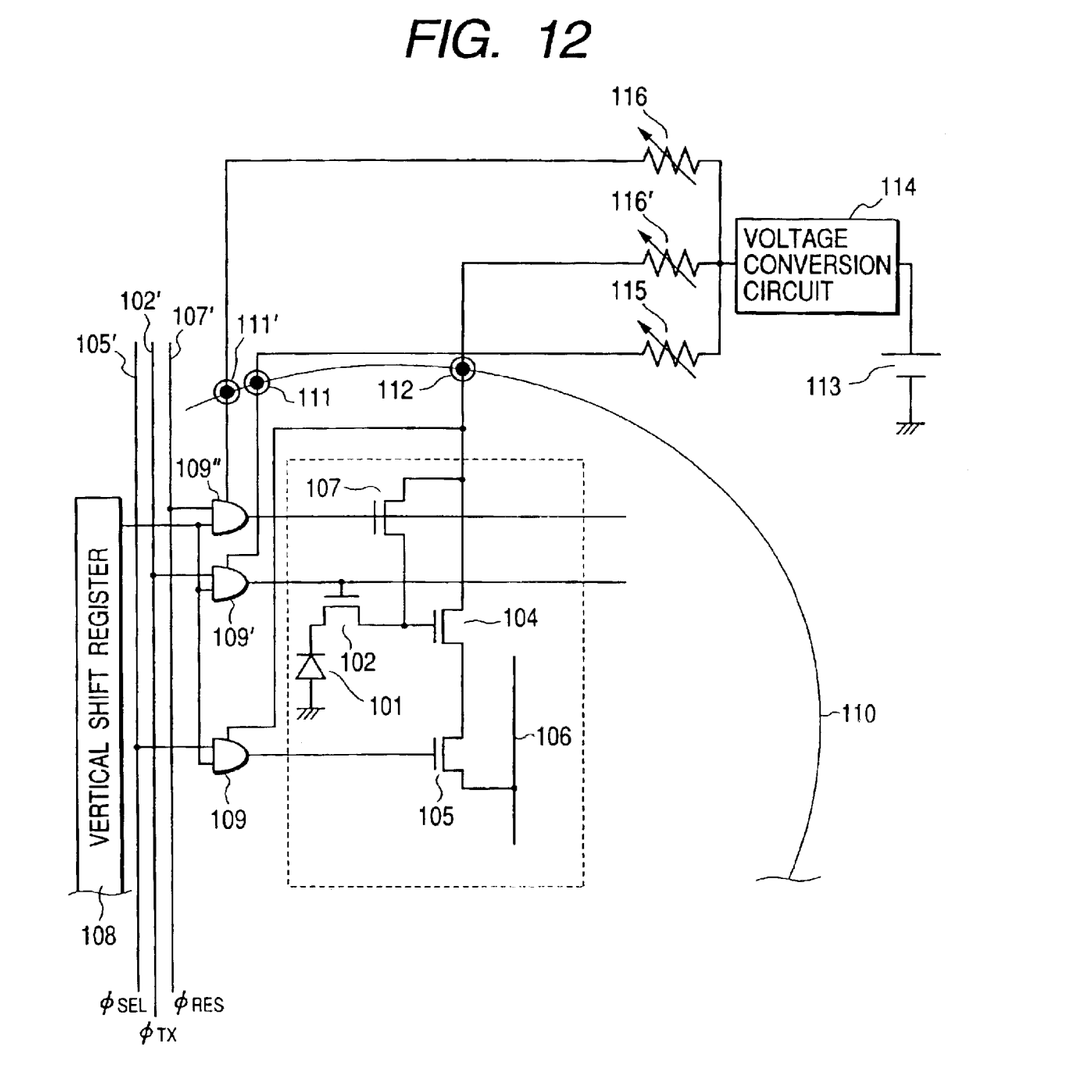
FIGS. 12 and 13 are views showing the function of the first and second embodiments of the present invention.

In-the foregoings, there have been explained configurations provided with the separate first or second potential setting circuit as shown in FIGS. 9 and 11, but the solid state image pickup apparatus may be integrally provided with the first and second potential setting circuits as shown in FIG. 12.

In FIG. 12, the AND circuit 109, the input terminal 111 and the variable resistor 116 constitute a first potential setting circuit, while the AND circuit 109, the input terminal 111' and the variable resistor 116' constitute a second potential setting circuit.

Figure 13:
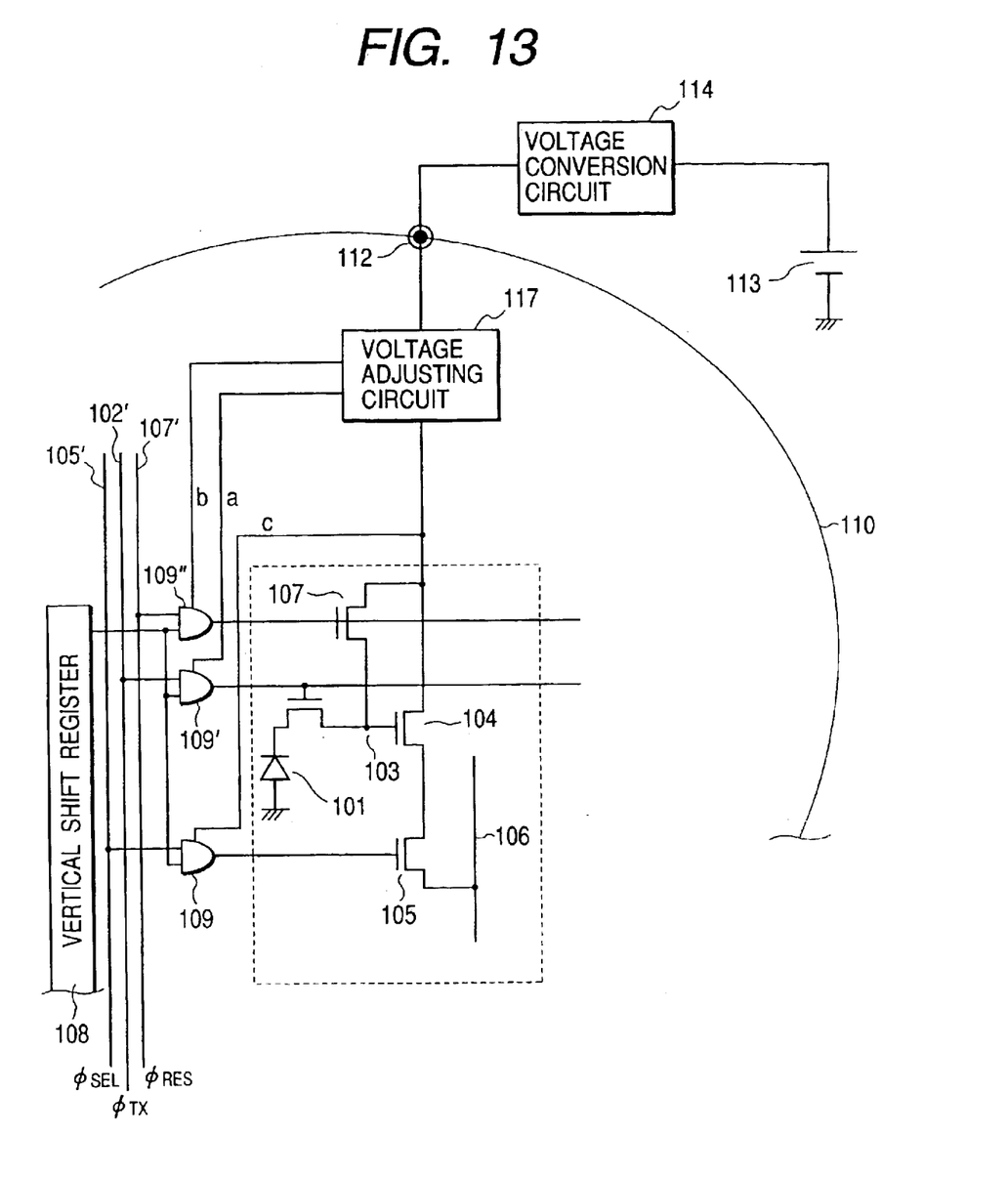

Also the first and second potential setting circuits may be provided, as shown in FIG. 13, in a same semiconductor chip in which the solid state image pickup circuit is formed. Stated differently, the solid state image pickup apparatus may include a voltage adjusting circuit 117 capable of supplying different voltages, for adjusting the voltages supplied to the transferring MOS transistor and the resetting MOS transistor.

The circuit shown in FIG. 13 is so designed as independently to set the power supply voltage for driving the solid state image pickup apparatus, the voltage supplied to the gate of the transferring MOS transistor 102 and the voltage supplied to the gate of the resetting MOS transistor 107, but the voltage supplied to the gate of the transferring MOS transistor 102 or that supplied to the gate of the resetting MOS transistor 107 may be made common with the power supply voltage. In FIG. 13, the first and second potential setting circuits are constituted by the AND circuit 109 and a voltage adjusting circuit.

As explained in the foregoing first and second embodiments, the present invention allows to avoid remaining of the photo-induced charge in the transfer channel even in the presence of fluctuation of the manufacturing process, thereby providing advantages such as:

a) securing a constant amount of the total transferred charge, thus maintaining a constant sensitivity; and b) preventing generation of the retentive image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid state image pickup apparatus wherein each pixel comprises:

a photoelectric conversion element;

transfer switch means including a first MOS transistor to transfer a signal charge generated in said photoelectric conversion element;

a floating diffusion area to receive the signal charge through said transfer switch means;

reset switch means including a second MOS transistor to reset the potential of said floating diffusion area; and gate voltage setting means to set the gate voltage respectively of one or the other, or both, of the first and second MOS transistors of each pixel so as to satisfy a condition that the channel voltage of said first MOS transistor is between the depletion voltage of said photoelectric conversion element and the saturation voltage of said floating diffusion area.

2. A solid state image pickup apparatus according to claim 1, wherein said gate voltage setting means sets the gate voltage of said first MOS transistor to be different from the gate voltage of the second MOS transistor.

3. A solid state image pickup apparatus according to claim 2, wherein said gate voltage setting means sets the gate voltage of said first MOS transistor to be smaller than the gate voltage of the second MOS transistor.

4. A solid state image pickup apparatus according to claim 1, wherein said photoelectric conversion element is a PN photodiode formed on a semiconductor substrate.

5. A solid state image pickup apparatus including said gate voltage setting means as claimed in claim 1, 2, 3 or 4, wherein said solid state image pickup apparatus is formed on a semiconductor chip.

* * * * *

UNITED STATES PATENT AND TRADEMARK OFFICE
CERTIFICATE OF CORRECTION

| | | |
|---|---|---|
| PATENT NO. | : 7,110,030 B1 | |
| APPLICATION NO. | : 09/264719 | |
| DATED | : September 19, 2006 | |
| INVENTOR(S) | : Tetsunobu Kochi et al. | |

It is certified that error appears in the above-identified patent and that said Letters Patent is hereby corrected as shown below:

ON THE TITLE PAGE [56] REFERENCES CITED:

Foreign Patent Documents, "613597" should read --6-13597--; and
Other Publications, insert: --Trial Decision with respect to Trial against examiner's decision of refusal in JPA 11-261046, laid open on September 24, 1999.--.

COLUMN 1:

Line 20, "type a" should read --type, a--.

COLUMN 3:

Line 36, "an" should be deleted; and
Line 49, "allows" should read --allow--.

COLUMN 4:

Line 15, "well area" should read --well area 2--.

COLUMN 6:

Line 27, "outputs-the" should read --outputs the--; and
Line 51, "induced" should be deleted.

UNITED STATES PATENT AND TRADEMARK OFFICE
CERTIFICATE OF CORRECTION

PATENT NO. : 7,110,030 B1
APPLICATION NO. : 09/264719
DATED : September 19, 2006
INVENTOR(S) : Tetsunobu Kochi et al.

It is certified that error appears in the above-identified patent and that said Letters Patent is hereby corrected as shown below:

<u>COLUMN 7</u>:

Line 55, "In-the" should read --In the--; and
           "foregoings," should read --foregoing,--.

Signed and Sealed this

Nineteenth Day of June, 2007

JON W. DUDAS
*Director of the United States Patent and Trademark Office*